REVERSIBLE ELECTRONIC SEQUENCE SWITCHING NETWORK

Filed June 10, 1960 2 Sheets-Sheet 1

INVENTOR
Hans-Joachim Kunzke
BY George H. Spencer
ATTORNEY

INVENTOR

Hans-Joachim Kunzke

BY George H. Spencer

ATTORNEY

United States Patent Office 3,067,341

Patented Dec. 4, 1962

3,067,341
REVERSIBLE ELECTRONIC SEQUENCE SWITCHING NETWORK

Hans-Joachim Kunzke, Spohle uber Varel, Oldenburg, Germany, assignor to Olympia Werke A.G., Wilhelmshaven, Germany Filed June 10, 1960, Ser. No. 35,174
Claims priority, application Germany June 20, 1959
10 Claims. (Cl. 307—88.5)

The present invention relates to an electronic sequence switching network which can be used, for example, in electronic computers to control switching operations to be conducted in steps that follow a predetermined sequence.

More particularly, the present invention relates to an electronic sequence switching network which can be used with advantage in matrix storage cores.

It is known in the art to use bistable electronic circuit networks, such as flip-flops, as sequence switches. One of the inputs of these flip-flops is periodically acted upon by a train of trigger pulses as basically provided for in electronic computers for the purpose of synchronizing all of the various switching operations therein.

For operation of electronic computer and storage devices, electronic sequence switches are needed which can be controlled according to a program and which allow the direction of the successive switching steps to be reversed. Existing sequence switches capable of being reversed with respect to their running direction have a number of inherent disadvantages. First, they require many circuit elements to make possible the reversal of their operative running direction. Second, the reversal produces disturbing pulses when the circuit connections of particular elements are changed. These disturbing pulses produce additional undesired information signals and thus distort the sought-for information pattern. Consequently, additional corrective circuits are needed to eliminate such distortion of the known networks. Finally, the running direction of existing sequence switching networks can not be reversed at any state of operation thereof. This is of decisive disadvantage when storage matrices of electronic computers are used to store or play back numbers of various lengths.

It is, therefore, an object of the present invention to provide a new and improved step switching network which does not possess the deficiencies of the heretofore known networks.

It is another object of the present invention to provide a new step switching network the running direction of which can be reversed at any state of operation without distorting the information pattern to be transmitted and controlled.

It is still another object of the present invention to provide a new step switching network which can also operate in parallel, which mode of operation is realizable at any state of operation.

It is yet another object of the present invention to provide a new and improved step switching device which can be stopped at any state and started again in any mode independent of the mode prior to the stopping, without producing a distortion in the information pattern.

It is a further object of the present invention to provide a new and improved step switching network for electronic computers which will allow the computers to be controlled according to any program without it being necessary to idle the computer while a change of mode is effected.

According to one aspect of the invention in a preferred embodiment thereof, a sequence switching network is provided with bistable switching elements. Each element has two input terminals, one of which is supplied with a train of trigger pulses whereas the other is connected to the output terminal of a logical "or"-circuit network having at least two input terminals. These last-mentioned two input terminals are connected to the preceding and the succeeding switching element, respectively, in the sequence switching network; furthermore, these two input terminals may selectively be blocked by selectively connecting them to D.C. voltage biasing means. If all of the input terminals of the "or"-circuit networks of the sequence switching network connected to the following switching element are blocked by the biasing means, the sequence switching network runs in forward direction, whereas a biasing of the other input terminals of the "or"-circuit network causes the separate switching network to run in the reverse direction.

The primary advantage of the network according to the present invention is that only D.C. voltages are used to predetermine the particular mode, so that the application of these voltages can not produce any distortion in the information pattern. Furthermore, the mode may be changed even if a run of the network in one direction has not been completed. Thus, the network can be stopped at any state of operation and its mode can be changed.

Additional objects and advantages of the present invention will become apparent upon consideration of the following description when taken in conjunction with the accompanying drawings in which.

Figure 1:
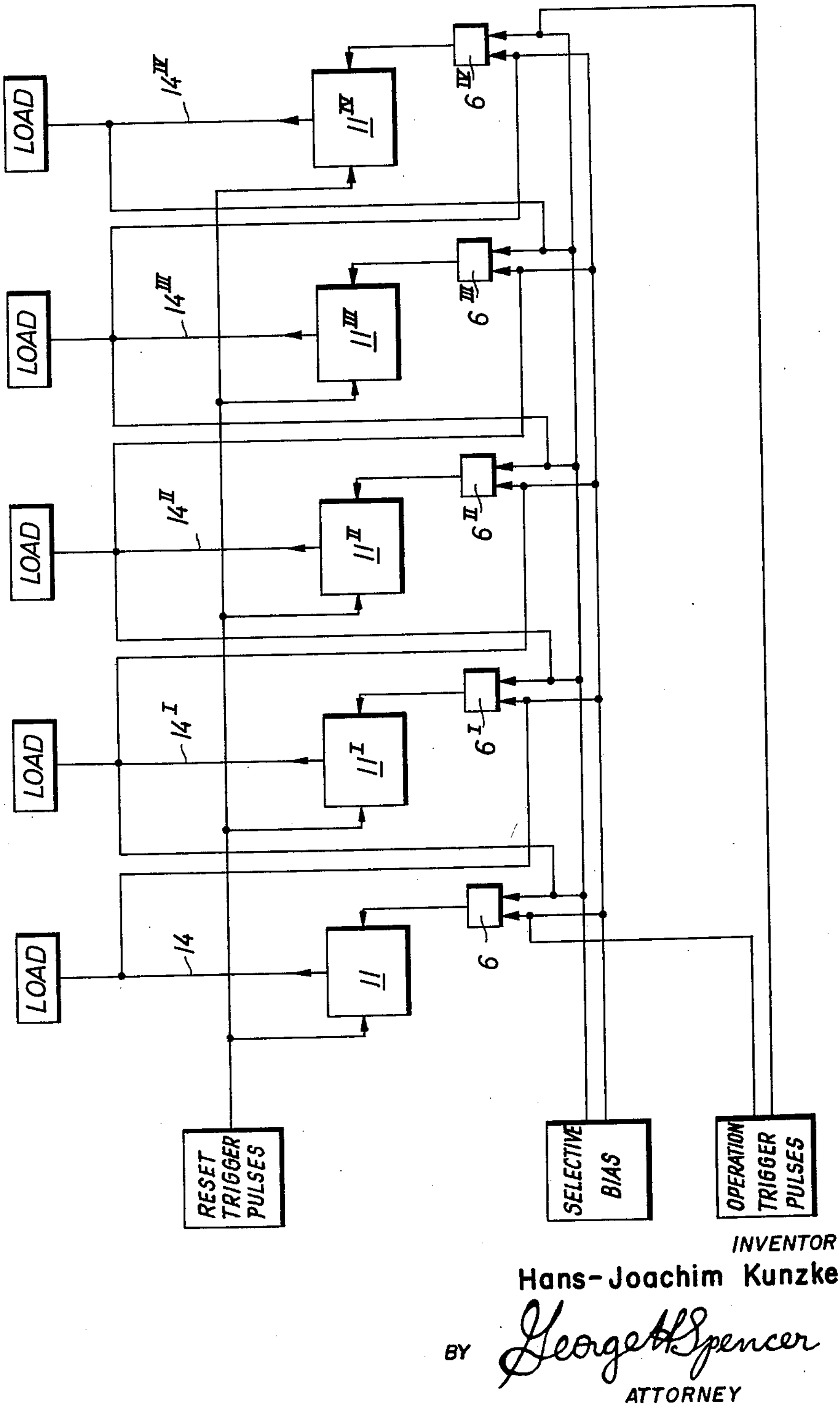
FIGURE 1 is a block diagram of a sequence switching network according to the present invention.

Referring in detail to the drawings, FIGURE 1 shows a sequence switching network having five switching elements such as bistable flip-flops 11, $11^{I}$, $11^{II}$, $11^{III}$, $11^{IV}$. The left-hand input terminals of all of the flip-flops are connected to a common reset trigger pulse source. The right-hand input terminal of each flip-flop is connected to a corresponding logical element, specifically a logical "or"-circuit network designated by 6, $6^{I}$, $6^{II}$, $6^{III}$, $6^{IV}$, respectively. The left-hand input of each logical element 6 to $6^{IV}$ is connected to the output terminal 14 to $14^{IV}$, respectively, of the succeeding flip-flop element 11 to $11^{III}$, while the right-hand input of each logical element 6 to $6^{III}$ is connected to the outjut terminal $14^{I}$ to $14^{IV}$, respectively, of the succeding flip-flop element $11^{I}$ to $11^{IV}$. The left-hand input terminal of logical element 6 and the right-hand input terminal of logical element $6^{IV}$ are further connected to an operation trigger pulse source. All of the input terminals of all of the logical elements are further connected to a selective bias source, and each of the output terminals of the flip-flop elements is connected to a corresponding load.

Figure 2:
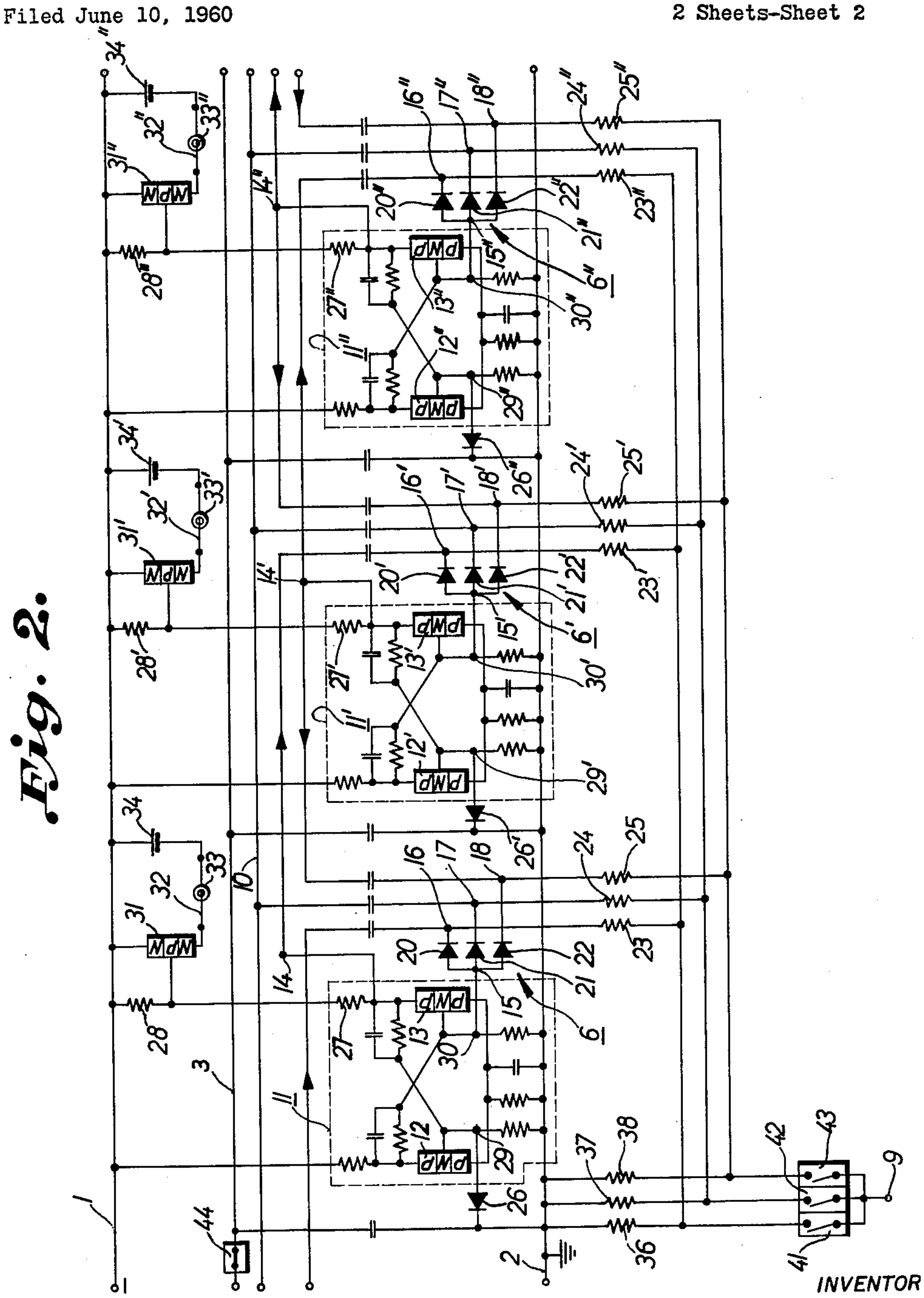
FIGURE 2 is a circuit diagram of a portion of the network shown in FIGURE 1, illustrating additional improvements and modifications of the basic design.

Details of this sequence switching network are shown in FIGURE 2 and the operation of the network will be explained in connection therewith.

FIGURE 2 shows only three switching circuit elements, namely, elements 11, 11' and 11", all of similar construction. Only element 11 will be described in detail, it being understood that in FIGURE 2 the corresponding component parts of elements 11' and 11" are identified by the same basic reference numeral followed by a single or double prime. Thus, element 11 comprises two transistors 12 and 13 interconnected to form a bistable flip-flop circuit. These bistable flip-flop circuits per se are well known and therefore need not to be discussed in detail. For purposes of the following description, it will be assumed that each of the switching elements is in "off" position when the transistor 12 (or 12', 12") is conductive, and in "on" position when transistor 13 (or 13', 13") is conductive. The transistors reference their operating voltage potential to a negative input power line 1 and a grounded line 2.

The left-hand inputs 29, 29' and 29'' of the elements 11, 11' and 11'' are capacitively coupled to an input line 3 via rectifier elements 26, 26' and 26'', respectively. The circuit through line 3 is controlled by a switch 44. This switch 44 is illustrated only schematically and can be of any suitable kind; preferably, it is an electronic switch of known design. Negative reset trigger pulses are fed to line 3 when switch 44 is closed; if desired, these pulses may be produced by the switch itself. The pulses can also be produced in an electronic computer to which the illustrated circuit arrangement pertains.

The right-hand inputs 30, 30' and 30'' of the elements 11, 11' and 11'', respectively, are connected to output terminals 15, 15' and 15'', respectively, of the logical elements which are shown as "or"-circuits 6, 6' and 6'', respectively. The "or"-circuit 6 associated with switch 11 includes the three diodes 20, 21 and 22 which have their anodes directly connected to output terminal 15. The "or"-circuits 6' and 6'' associated with element 11' and 11'', respectively, are similarly designed.

"Or"-circuit 6 has three input terminals 16, 17 and 18. These input terminals are connected to the network shown as follows: Terminal 16 is capacitively coupled to the output of the flip-flop element of the preceding stage. Thus, terminal 16' of element 11' is capacitively coupled to output 14 of element 11 which is the switching element preceding circuit 11', while terminal 16'' of "or"-circuit 6'' is capacitively connected to output 14' of circuit 11' which is the preceding switching element for circuit 11''. It will be appreciated that output 14'' of circuit 11'' may be connected to one output of an "or"-circuit of a following stage (not shown in FIGURE 2). Output 16 of "or"-circuit 6 is connected to the operation trigger pulse source, triggering the sequence switch to run in the forward direction.

From the above description it will be apparent that the invention is not limited to a five-stage or three-stage network as shown in FIGURES 1 and 2, respectively, but that any number of stages may be provided. The inputs 16, 16' and 16'' of circuit 6, 6' and 6'', respectively, are further connected to a positive blocking bias voltage 9 via resistances 23, 23' and 23'', respectively, and to a common switch 41, which may also be an electronic switch of any suitable design.

Input terminal 18 is connected to the output terminal 14' of the succeeding element 11; input terminal 18' is connected to output terminal 14'' of circuit 11''; and input 18'' is connected to the output terminal of a following switching element (not shown in FIGURE 2). Furthermore, terminals 18, 18' and 18'' are connected via separate resistors 25, 25' and 25'', respectively, to a common line terminating at a switch 43 which may be of the same design as switch 41 and also connects these input terminals 18, 18' and 18'' to the positive bias 9. The input terminals 17, 17' and 17'' are separately and capacitively connected to a common line 10 fed with pulses for parallel operation of the sequence switching network. These inputs 17, 17' and 17'' are also connected to bias 9 via separate resistors 24, 24' and 24'', respectively, and a switch 42 which may likewise be similar to switch 41.

Resistors 23, 23' and 23'' are further connected in series with a resistor 36 which, in turn, is connected to ground line 2. Resistors 37 and 38 serve to ground inputs 17, 17', 17'' and 18, 18', 18'', respectively, if the switches 42 and 43, respectively, are open.

The switching elements as illustrated are used to control magnetic storage cores. A driving transistor 31, preferably the base electrode thereof, is connected to the junction of a voltage divider made up of resistors 27 and 28 and inserted between output terminal 14 and power line 1. The collector circuit of transistor 31 includes a storage wire 32 of a core 33 fed from a voltage source 34. This control circuit for the storage is simplified and serves only for illustration of a load circuit and of a particular use which can be made of the network according to the present invention. The storage circuits controlled by circuits 11' and 11'' are of similar design and the corresponding component parts are likewise denoted with the same corresponding basic reference numerals followed by a single or double prime.

If the blocking bias voltage 9 is applied to any one of the inputs of the logical elements, the diode pertaining to this input terminal is biased to cut-off to such an extent that a reverse pulse appearing at this input from the output of any other switching element can not pass through this diode to reach the right-hand input of the associated switching element. Thus, if, for example, switch 41 is closed, diodes 20, 20' and 20'' are biased so that no pulse can pass through them.

*Operation*

The network as illustrated in FIGURE 2 operates as follows:

In the normal state, transistors 12, 12' and 12'' are conductive due to negative reset trigger pulses applied to input terminals 29, 29' and 29'', respectively. Also, output terminals 14, 14' and 14'' are negative. If a negative control pulse appears at any one of the inputs 15—30, 15'—30', 15''—30'', the associated transistor (13, 13' or 13'') is rendered conductive and the associated output (14, 14' or 14'') is shifted toward a relatively positive potential and thus will assume a potential substantially equal to ground potential. For any particular switching element thus operated upon, nothing else will happen until another negative reset trigger pulse appearing at 29 (or 29', 29'') renders the transistor 12 (or 12', 12'') conductive while transistor 13 (or 13', 13'') is rendered nonconductive due to the flop action. Thus, the negative reset trigger pulses shift the switching elements back to normal state after they have been acted upon by pulses appearing at their right-hand input (30, 30' or 30''). Thus far, only the generally known operation of a flip-flop circuit has been described so as to facilitate a complete understanding of the present invention.

Assuming first that a negative pulse appears at terminal output 15', thereby causing a corresponding control pulse to appear at input terminal 30' of element 11' and a relatively positive potential to appear at output terminal 14'. This output potential has no effect, but the reset pulse which flops stage 11' back to normal produces a negative pulse at output terminal 14'' which is also applied to element 11 via terminal 18, rectifier 22, output terminal 15 and input terminal 30. The same negative control pulse is also applied to element 11'' via terminal 16'', rectifier 20'', and terminals 15'', 30''. As will be described below, the effectiveness of one of the pulses can be suppressed or excluded by biasing either terminal 18 or terminal 16''. However, one of the elements 11 or 11'' will now be switched "on" due to this action in element 11'. The next reset pulse reaching the element (11 or 11'') which has been switched "on" will switch this stage "off" again so that at its output a negative pulse is produced which will be applied to its following and its preceding stages through their associated logical elements.

Assuming that the control effect by these negative output pulses exerted on the preceding switching element can be suppressed, as will be described below, then it is apparent that by such action the following switching elements will be turned "on" successively at time intervals which are determined by the sequence of the resetting trigger pulses applied to line 3. Each switching element which has been turned "on" opens its associated driver transistor (31, 31' or 31'') and the associated storage wires (32, 32' or 32'') will thus be fed with current.

In the operation as described, first wire 32' was fed with current, and after element 11' was reset, element 11'' caused transistor 28'' to permit current flow through wire 32''. In case other elements, such as $11^{III}$ and $11^{IV}$ in FIGURE 1 are provided, they will be turned "on" and "off" successively in a similar fashion. Whether or not the associated wires may be switched by the current through the associated wires may further be determined by additional means, for example, a conjunction circuit (not shown).

To go now into further detail, it will be assumed that a forward sequence or advance mode means switching operation running from left to right, as viewed in the drawings, i.e., the successive turning "on" and "off" of elements 11, 11' and 11'', more generally designed by $11^x$. In order to produce this advance mode it is necessary that the negative output pulse of each element, i.e., the negative drop at $14^x$, can reach only the input of the following element (via terminal $16^{x+1}$ and diode $20^{x+1}$, etc.) while the input $18^{x-1}$ of the preceding element $11^{x-1}$ is blocked. This mode is accomplished by closing switch 43, rendering all inputs $18^x$ positive. The associated diodes $22^x$ are thus biased in reverse direction, and the negative output pulse at $14^{x-1}$ can not overcome the positive bias of all of these diodes $22^x$. Thus, the output pulse of any element $11^x$ has no effect on element $11^{x-1}$. The effect of line 10, and of pulses running therethrough has not yet been discussed, but it will be apparent that their effectiveness on any one of the switching elements can be suppressed if switch 42 is also closed thus applying a negative reverse bias to the associated diodes 21, 21' and 21'' of the "or"-circuits. If also switch 41 were closed, all of the diodes of the "or"-circuits would be biased in their reverse direction and no control pulse whatever could appear at the output of any "or"-circuit. However, in the advance mode, switch 41 is open and thus the terminals 16, 16' and 16'' are at ground potential and could be rendered negative by a negative pulse coming from a preceding switching element.

The advance mode is started by applying an operation trigger pulse to terminal 16. Switch 41 is open and, thus, this pulse travels via diode 20, output terminal 15, input terminal 30 and turns element 11 "on." Transistor 31 is rendered conductive, thus permitting passage of current through wire 32. The next reset pulse appearing in line 3 and terminal 29 turns element 11 "off," so that a negative pulse is produced at output terminal 14, which negative pulse reaches terminal 16', passes through diode 20' and turns "on" switching element 11'; the next reset pulse in line turns element 11' "off" again. While element 11' was "on," current was permitted to pass through transistor 31' and wire 32'. Upon turning element 11' to "off," the negative pulse at output terminal 14' reaches terminal 18 and terminal 16''. Diode 22 is biased to cut-off and the pulse at terminal 18 cannot pass, but diode 20'' is open and the pulse at terminal 16'' may pass therethrough thus triggering switch 11'' to "on," whereafter current is permitted to flow through transistor 31''.

It is apparent that the sequence of switching will advance further in a similar manner.

Another mode of operation is the reverse mode, in which the switching elements are turned "on" and "off" in a succession running from right to left, as viewed in FIGURE 2.

In this case, the negative pulse at output $14^x$ of any switching element $11^x$ must reach only input $18^{x-1}$ of the "or"-circuit $6^{x-1}$ associated with the preceding element $11^{x-1}$. This negative pulse must not be effective at input $16^{x+1}$ of the "or"-circuit $6^{x+1}$ associated with the succeeding element $11^{x+1}$. In this case switch 41 will be closed, thus shifting the bias of all of the diodes $20^x$ into the reverse direction which bias can not be overcome by a control pulse from element $11^{x-1}$ so long as switch 43 is closed. Switch 42 remains open. The trigger pulse for operation is applied to terminal 18'' of the last logical elements 6'', for example 18'' if only three switches are used. Now the succession of the elements as they are turned "on" and "off" is reversed as compared with the advance mode.

In the parallel mode, all switching elements or groups of elements are turned "on" and/or "off" simultaneously. In this case switches 41 and 43 are both closed, thus closing all inputs $16^x$ and $18^x$, switch 42, however, being opened. A pulse applied to line 10 can now reach all of the elements because there is no positive bias at inputs 17, 17', 17'', etc. The switching elements do not mutually influence each other and can be operated only simultaneously.

It is apparent that the mode of operation of the network depends on the combination of closed and opened switches 41, 42 and 43. If switch 44 is opened, the train of reset pulses applied to line 3 is interrupted and the network remains in the state it had immediately prior to the opening of switch 44. Now the combination of switches 41, 42, 43 can be changed and if switch 44 is then closed again, the network immediately runs in the new mode. The changing of the mode does not produce any disturbing pulse which could disturb the information pattern. This advantage of the circuit connection according to the present invention is achieved particularly in that during the change of the mode no alteration occurs in the state of operation of any of the switching elements (11, 11', 11'', etc.) Only true D.C. voltages are used to alter the bias of the rectifiers of the "or"-circuits. Thus, any program can be realized by means of this sequence switching network without distortion of the information pattern transmitted.

If switches 41, 42 and 43 are designed as electronic switches, for example, of the same type as switching elements 11, 11' and 11'', the mode of operation can be controlled by command pulses. The entire program for the sequence switching network can then be predetermined as a pulse train pattern, applied to the switches 41, 42 and 43. Also, the entire circuit can be designed to produce the pulses which are then fed back to these switches 41, 42, 43.

It is apparent that the principle of the present invention is also suitable for more pulse inputs. For example, each switching element 11, 11', etc., can also be part of a vertical sequence switching network whereby a two-dimensional matrix would be formed. Each input has to be associated with a bias switch such as 41, 42, etc., and it is also possible to continue several of these switches to limit the possible combination for facilitating the operating if the network, or the system to which it pertains, is to be used for a particular purpose only.

It will be understood that the above description of the present invention is susceptible to various modifications, changes and adaptations, and the same are intended to be comprehended within the meaning and range of equivalents of the appended claims.

I claim:

1. In an electronic sequence switching network, the combination which comprises: a series of bistable switching elements each including an output terminal and a first and a second input terminal, said first input terminal being adapted to be supplied with a train of reset trigger pulses; an "or"-circuit network having at least two input terminals and an output terminal connected to said second input terminal of one of said bistable elements; means for connecting the output terminal of each switching element with an input terminal of the "or"-circuit network of at least one of the two adjacent switching elements; D.C. biasing voltage means; and selective switching means for connecting said biasing means to one of said input terminals of said "or"-circuit network and rendering such input terminal ineffective.

2. In an electronic sequence switching network having a series of bistable switching elements, each element having an output terminal and a first and a second input terminal, the combination which comprises: means for supplying a train of reset trigger pulses to said first terminal; at least two diodes each connected with one of its electrodes to said second input terminal; D.C. voltage biasing means; means for selectively connecting the other electrodes of each diode to said biasing means; and means connecting one of said diodes with the output terminal of the preceding switching element and the other of said diodes with the output terminal of the succeeding switching element for transmitting output pulses which pass through said diodes to said second input terminal only if the electrodes are disconnected from said biasing means.

3. A sequence switching network comprising: at least three switching elements, each having two input terminals and an output terminal; means for supplying a train of reset trigger pulses to one input terminal; at least three "or"-circuit networks associated with said switching elements, respectively, each "or"-circuit network having an output terminal connected to the other one of said input terminals of its associated switching element, each "or"-circuit having at least two input terminals; means for connecting one of the input terminals of an "or"-circuit to the output terminal of a preceding switching element; means for connecting another one of the input terminals of an "or"-circuit to the output terminal of a succeeding switching element; D.C. voltage biasing means; and means for selectively connecting said biasing voltage as a blocking voltage to one of said inputs of said "or"-circuit network.

4. A network as set forth in claim 3 each "or"-circuit network including a third input terminal; a trigger pulse line; said switching means including means for simultaneously connecting the third input terminal of all of said "or"-circuit networks to said trigger pulse line and for alternatively connecting all of said third input terminals to said D.C. biasing means for blocking said third terminals.

5. An electronic sequence switching network comprising: a plurality of flip-flop elements each having two input terminals and one output terminal; a plurality of logical "or"-circuits associated separately one by one with said flip-flop elements, said logical "or"-circuits having at least two input terminals and two diodes connected in series, respectively; means for connecting the diodes of any logical "or"-circuit to one input terminal of its associated flip-flop element; means for connecting one of said input terminals and its associated diode to the output of the preceding flip-flop element; means for connecting the other input terminal and its associated diode to the output terminal of the succeeding flip-flop element; means for interconnecting all inputs of said "or"-circuits which are connected to output terminals of a preceding flip-flop element; means for interconnecting all inputs of said "or"-circuits which are connected to the output terminal of a succeeding flip-flop element; and means for selectively feeding a D.C. biasing voltage to any of said last-mentioned means for blocking the diodes associated therewith.

6. An electronic sequence switching network as set forth in claim 5, further comprising transistorized load circuits connected to said output terminals of said flip-flop elements.

7. In an electronic sequence switching network, the combination which comprises: a series of at least three flip-flop elements each having an input and an output; at least three logical "or"-circuits associated with said flip-flop elements, respectively, each "or"-circuit having an output connected to the input of the corresponding flip-flop element, each logical "or"-circuit which is associated with a flip-flop element other than the first and last flip-flop elements in said series having two inputs one of which is connected to the output of the preceding flip-flop element and the other of which is connected to the output of the succeeding flip-flop element; and means for applying a D.C. bias to any of the inputs of said logical "or"-circuits for rendering such inputs ineffective.

8. An electronic sequence switching network, comprising, in combination: a series of at least three flip-flop elements each having an input and an output; at least three logical "or"-circuits associated with said flip-flop elements, respectively, each "or"-circuit having an output connected to the input of the corresponding flip-flop element, each logical "or"-circuit having at least two inputs, one of the inputs of each logical "or"-circuit which is associated with a flip-flop element other than the first and last flip-flop elements in said series being connected to the output of the preceding flip-flop element and the other input of such logical "or"-circuit being connected to the output of the succeeding flip-flop element, one of the inputs of the logical "or"-circuit associated with the first flip-flop circuit being connected to the output of the second flip-flop element and one of the inputs of the logical "or"-circuit associated with the last flip-flop circuit being connected to the output of the next-to-last flip-flop element; means connected to the other of said inputs of said logical "or"-circuit associated with said first flip-flop element as well as to the other of said inputs of said logical "or"-circuit associated with said last flip-flop element for supplying operation trigger pulses; and means for applying a D.C. bias to any of the inputs of said logical "or"-circuits for rendering such inputs ineffective.

9. An electronic sequence switching network as defined in claim 8 wherein each of said flip-flop elements has a second input; said network further comprising means for supplying reset trigger pulses to said second inputs of said flip-flop elements.

10. An electronic sequence switching network as defined in claim 8 wherein each of said logical "or"-circuits has a third input; said network further comprising means for applying trigger pulses to said third inputs simultaneously, and means for applying a D.C. bias to said third inputs for rendering the same ineffective.

References Cited in the file of this patent

UNITED STATES PATENTS

| | | |
|---|---|---|
| 2,764,343 | Diener | Sept. 25, 1956 |
| 2,931,922 | Tubinis | Apr. 5, 1960 |